United States Patent [19]

Gentile

[11] Patent Number: 4,875,772
[45] Date of Patent: Oct. 24, 1989

[54] REMOTELY CONTROLLED OPTICAL TIME DOMAIN REFLECTOMETER SERVING A PLURALITY OF FIBER OPTIC CABLES

[75] Inventor: John R. Gentile, Frankfort, N.Y.

[73] Assignee: Laser Precision Corporation, Utica, N.Y.

[21] Appl. No.: 253,088

[22] Filed: Oct. 4, 1988

[51] Int. Cl.$^4$ ........................................... G01N 21/88
[52] U.S. Cl. .................................................. 356/73.1
[58] Field of Search ....................................... 356/73.1

[56] References Cited

U.S. PATENT DOCUMENTS

4,737,026 4/1988 Dalgoutte et al. ................. 356/73.1

Primary Examiner—Vincent P. McGraw
Attorney, Agent, or Firm—Thomas J. Plante

[57] ABSTRACT

This application discloses a system in which a single optical time domain reflector is used to monitor a plurality of cables. In one embodiment two lasers having different wavelengths are separately fired into different cables, and the returning signals are fed into the appropriate port of a wavelength dependent coupler. In another embodiment, each laser simultaneouly checks two cables having different lengths, the length difference permitting identification of the cable in which a fault has occurred.

11 Claims, 5 Drawing Sheets

REMOTELY CONTROLLED OPTICAL TIME DOMAIN REFLECTOMETER SERVING A PLURALITY OF FIBER OPTIC CABLES

BACKGROUND OF THE INVENTION

This invention relates to apparatus used in the maintenance of fiber optic communication networks.

Such networks include a multiplicity of stations, called repeater huts, into each of which a plurality of fiber optic cables extend. Each such cable, which extends underground, contains a multiplicity of fiber optic strands, which carry the communication signals. Stations, or repeater huts, are underground chambers located perhaps 40 to 50 kilometers apart. The signals coming into a station on one cable are amplified, switched, and otherwise regenerated inside each hut, and then sent out on another cable.

Optical Time Domain Reflectometers (OTDRs) are, in effect, "laser radar" instruments which test the condition of fiber optic strands by injecting laser beam pulses into the strand at one point, and then receiving their returned reflections. The time elapsed from the sending to the returning of the pulse indicates the distance from the OTDR to the point of reflection. Variations in the energy of the returning pulses are used to diagnose the condition of the fiber optic strand. These diagnoses are used for several purposes: accurate splice analysis, pinpointing fault locations, cable acceptance testing, cable installation, and end-to-end tests. Most of these purposes relate to installation and testing of the initial system.

However, the pinpointing of fault locations is of extreme importance when damage accidentally occurs to an existing cable installation, usually as the result of mechanical accident.

OTDRs may be carried to the sites of work, for use in diagnosing fiber optics cable problems. However, the assignee of this application has pioneered a remote control OTDR system, in which a central computer is separately linked to a plurality of OTDRs, each of which is located inside a station, or repeater hut, and each of which has its own computer linked to the central computer. Such a system provides many advantages, such as continuous remote monitoring of the cable links, triggering of an alarm if a problem occurs, and fast fault location from a remote central office terminal.

One problem with the remote control OTDR system is its expensiveness, due to the need for a separate OTDR at each station in the network.

SUMMARY OF THE INVENTION

The present invention permits each OTDR to serve a plurality of stations, thus substantially reducing total network cost.

Each locally installed OTDR has a wavelength multiplexing unit combined with a plurality of laser sources which send different wavelength signals. Thus, for example, the OTDR in one station can be instructed from the central control to send a signal having a higher wavelength; and that signal will automatically check the fiber optics cable extending in one direction from the station containing the OTDR. Or, the same OTDR can be instructed from the central control to send a signal having a lower wavelength; and that signal will automatically check the fiber optics cable extending in a different direction from the same station.

In other words, the cable being checked is identified by its assigned laser wavelength. This arrangement is very successful with two cables, and might be used with a larger number of cables which are all linked to the same OTDR-containing station.

Another version of the invention increases from two to four the number of cables serviced by a single OTDR. This is accomplished by sending the signal from each of two differing wavelength laser sources simultaneously into two cables, one of which is longer than the other. The sum of the two returning signals can be used to determine: (a) whether a fault, or break, has occurred in either of the two cables, (b) which of the two cables is damaged, and (c) where the damage has occurred.

DETAILED DESCRIPTION OF SPECIFIC EMBODIMENTS

Figure 1:
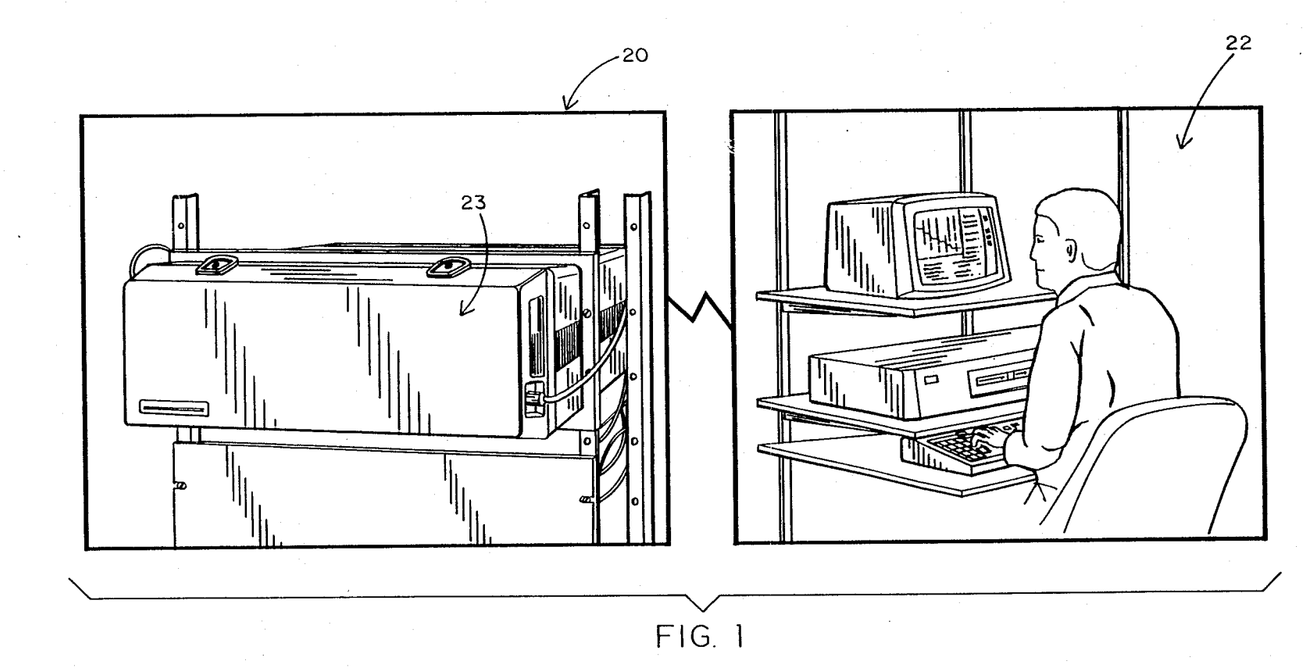
FIG. 1 shows a remote OTDR linked to a central control.

FIG. 1 shows a remote station 20, which is in a network of such stations linked to a central control computer 22. Each station is entered by at least two fiber optic cables (not shown) containing a large number of separate fiber optic strands, which have been suitably spliced to maintain maximum transmission efficiency.

Each cable contains one or more spare fiber optic strands, which are available for use in OTDR monitoring and damage location. The remote OTDR (23 in FIG. 1) permits continuous monitoring of the integrity of a fiber optic cable link between unmanned installations. Upon detection of signal loss between two repeater locations, an alarm sounds at the central control, and the central computer automatically comands the remote OTDR to scan the affected fiber. This enables the central office operator to view the backscatter signature of the damaged link on a terminal. Analysis and fault location can be carried out immediately, to greatly minimize any delay in getting a repair crew to the site of the fault.

Locating in a minimum amount of time the position of a damaged or broken fiber connection realizes tremendous savings, by minimizing the time needed to repair communications breakdowns. However, the communications operators want to monitor as many lines as possible with as few OTDRs as possible. They could use remotely controlled fiber optic switches, but these are nearly as costly as the OTDRs. And fiber optic switches have the additional disadvantage that they cause relatively high signal loss.

The present invention permits a fifty percent, and in one version a seventy-five percent, reduction in the number of OTDRs required for complete network monitoring.

Figure 2:
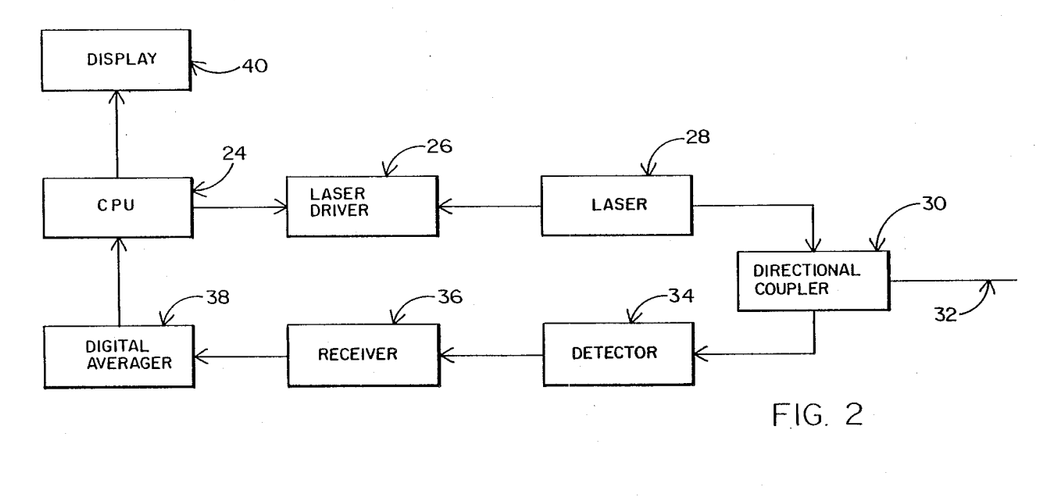
FIG. 2 shows diagramatically the rudimentary components of a standard OTDR.

FIG. 2 shows the basic components of a station-located OTDR. A CPU 24 is in control of the OTDR and in communication with central station 22 (FIG. 1). The CPU controls a laser driver 26, which causes laser beam 28 to be delivered via a directional coupler 30 to the fiber strand or strands 32 which serve the OTDR.

Reflected laser signals returning from the fiber or fibers 32 are directed by the directional coupler 30 to a detector 34, from which the returning signal goes to a receiver 36, and then to a digital averager 38. From the digital averager, the returning signal is directed to the CPU 24, and thence to a display 40 which may transmit to the central station.

The information supplied by the OTDR is used to locate unnatural changes in the laser energy moving back and forth through the fiber. There is a natural attenuation in the laser energy throughout its travel. In fact, the energy level of the returning pulses at detector 34 may be in the neighborhood of 0.00001 of the energy level leaving laser 28. The purpose of the digital averager 38 is to separate the weak returning laser signal from the much greater noise level in which it is buried. The returning pulsed signals are digitized and added together. The noise, on the other hand, is uncorrelated (random) in its timing; and the net effect of the noise will tend to reach a zero average value. By continuing long enough in adding up the digitized, coherent signals, a sufficient value is obtained to provide useful information.

The outgoing pulses generate reflections from every part of the fiber, but substantial scattering occurs. Normally, on a display graph, the energy of the recurring signal shows a gradually declining straight curve. A greater decline generally occurs at a splice. If an abrupt signal decline occurs at any point, a problem is indicated. The cable may have been damaged; damage to an OTDR fiber generally indicates damage to all the fibers in the cable. Also, a sudden increase in signal may indicate damage, due to increased Fresnel reflection.

An ideal fiber would provide, in the logarithm domain, a straight line dropping to the right, with small splice drops periodically. The slope of the line indicates the attenuation of the fiber in decibels per kilometer. Distance and location are always indicated by elapsed time.

Clearly, a monitoring system having a remote OTDR in every repeater station would provide an ideal network for locating and promptly correcting faults in fiber optic cable systems. But the costs of the OTDRs in such a system are a significant deterrent. So a problem to be addressed is trying to gain the full benefits with fewer OTDRs. One possible solution, as already stated, is to use fiber optic switching systems interconnecting the OTDRs. But such systems would be very costly, and have high signal loss.

The present invention provides a simple, but elegant, arrangement for cutting the costs by almost 50%, with very slight sacrifice of efficiency. The basic concept is to use a plurality of laser wavelengths, transmitted through a wavelength division multiplexer whose two entry ports are selectively responsive to different wavelengths. Such couplers are available, for example, from Gould Electronics. They are referred to as "Singlemode Fused Wavelength Division" couplers. They are intended for use "whenever it is necessary to combine or separate two optical data sources of differing wavelengths with virtually no optical loss".

Before explaining the value of such wavelength division in solving the problem of the present application, it will be helpful to describe the functioning of a standard coupler, such as the coupler 30 in FIG. 2.

Figure 3:
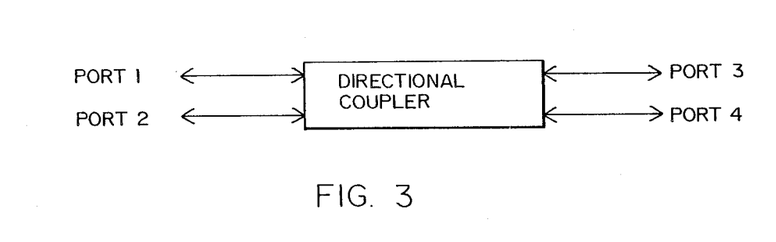
FIG. 3 diagrams the functions of a standard directional coupler in a standard OTDR.

FIG. 3 diagrams such a directional coupler, which provides a 50/50 beam-splitting effect, analagous to the beamsplitters used in interferometers. Referring to FIG. 3, light traveling into Port 1 will divide equally between Ports 3 and 4. The same is true for light traveling into Port 2. Light traveling in the reverse direction into either Port 3 or Port 4 will also split up equally and exit from Ports 1 and 2.

The coupling system used in the present invention incorporates a wavelength division multiplexer (or wavelength dependent coupler), which is the special type of directional coupler referred to above. A wavelength division multiplexer changes the ratio of the light exiting its output ports as a function of the wavelength of the light. If 1300 nanometer wavelength light is traveling into Port 1, then approximately 99% of it will exit from Port 3 and only 1% will exit from Port 4. If the wavelength is changed to 1550 nanometers, then approximately 99% will be emitted from Port 4 and only 1% from Port 3. Again, these properties are reciprocal when the light travels in the opposite direction.

Figure 4:
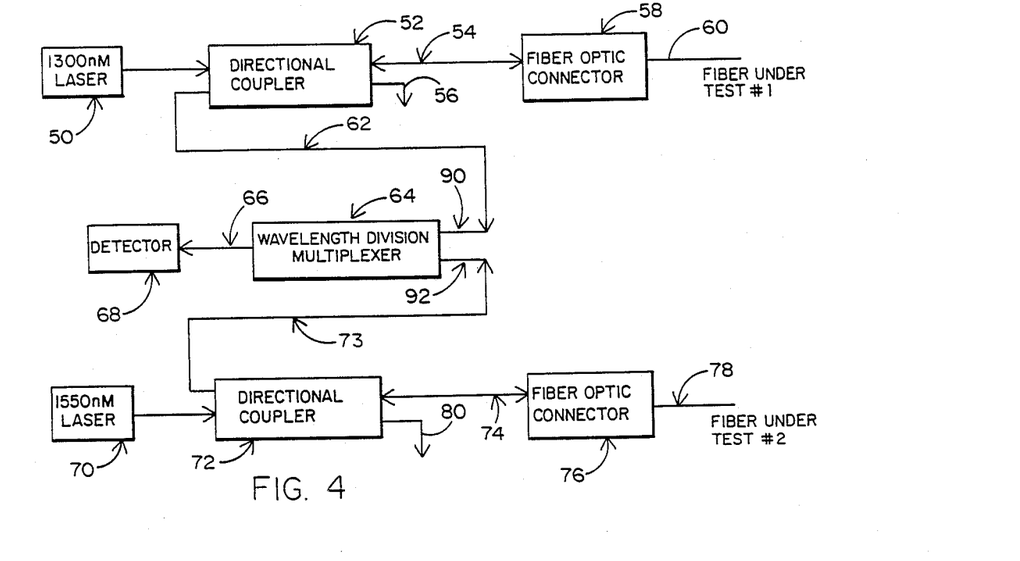
FIG. 4 is a diagrammatic showing of the present invention, in which a single OTDR services two fiber optics cables, using two lasers having outputs of different wavelengths.

FIG. 4 illustrates an embodiment of the present invention. Three parts, relatively inexpensive, are added to the OTDR of FIG. 2. The added parts are a second laser, a second directional coupler, and a wavelength division multiplexer (WDM). With this system, two test fibers are used, thus permitting two fiber optic cables to be monitored by a single OTDR.

A 1300 nanometer wavelength laser is shown at 50. Its output is fed through a standard directional coupler 52, which outputs 50% of the laser energy at each of two ports 54 and 56. The energy through Port 54 is connected by a fiber optic connector 58 to a first fiber optic test strand 60 (test fiber #1). Note that the energy leaving the second port 56 of coupler 52 is essentially wasted; but this splitting effect is common to all OTDRs.

The OTDR signal in test fiber #1 is part of one fiber optic cable. The returning laser signal from that cable is directed through directional coupler 52, and 50% of its energy exits along path 62 to the inlet port 90 of a wavelength division multiplexer 64. From the multiplexer 64, almost the entire returning signal is sent along path 66 to a detector 68.

If the operator desires to monitor the second fiber optic cable, test fiber #2 will be used. In this case a 1550 nanometer wavelength laser 70 will be fired. Its beam is fed through a second directional coupler 72, which directs 50% of the energy along path 74 through a fiber optic connector 76 into a second fiber optic test strand 78. Note that a second port 80 of coupler 72 receives 50% of the energy, which is essentially wasted.

The OTDR signal in test fiber #2 is in a second fiber optic cable leading in a different direction from the cable containing test fiber #1. The returning signal from the second cable is directed through directional coupler 72, and 50% of the energy is carried along path 73 to the inlet port 92 of the wavelength division multiplexer 64. From the multiplexer 64, almost the entire returning signal is sent along path 66 to detector 68.

The standard directional couplers 52 and 72 are referred to as wavelength independent couplers. The multiplexer 64 is referred to as a wavelength dependent coupler. Its internal construction is such that the 1300 nanometer wavelength signal entering its port 90 will be so split that approximately 99% of its energy exits from detector port 66, and only 1% exits from the other port (not shown). Also, the internal construction of multiplexer 64 is such that the 1550 nanometer wavelength signal entering its port 92 will be so split that approximately 99% of its energy exits from detector port 66, and only 1% from the other port (not shown).

Figure 5:
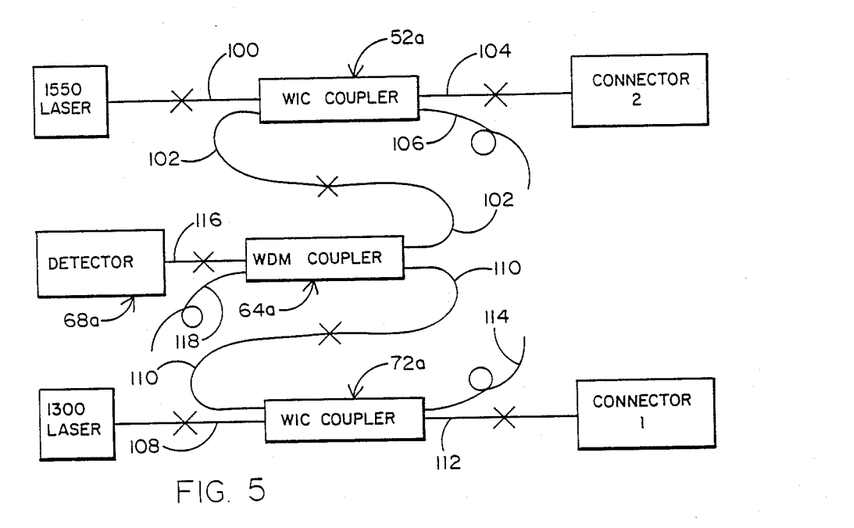
FIG. 5 is a diagrammatic showing similar to FIG. 4, but with additional details.
Figure 6:
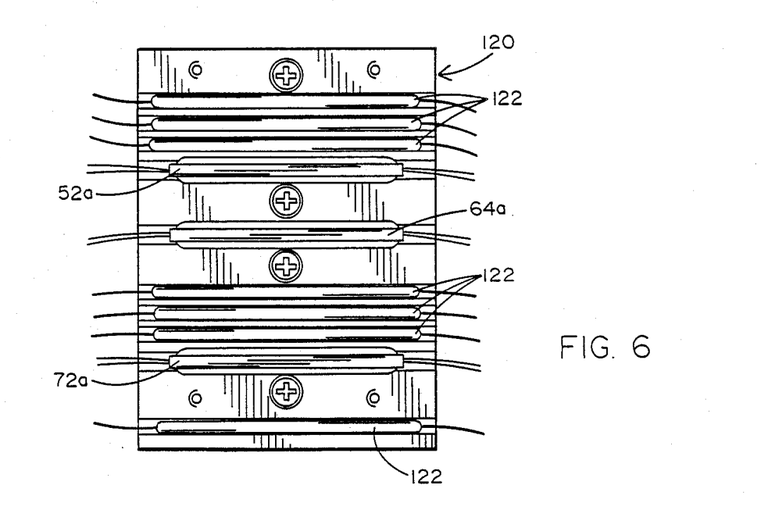
FIG. 6 shows the couplers and splices of FIG. 5 secured to a coupler mount.

FIGS. 5 and 6 show more details of the wavelength independent (WIC) and wavelength dependent (WDC) couplers. In FIG. 5, WIC 52a has two ports 100 and 102 at one end, and two ports 104 and 106 at the other end. WIC 72a has two ports 108 and 110 at one end, and two ports 112 and 114 at the other end.

The WDM 64a has two ports at one end: 116 is connected to detector 68a, and 118 is unconnected. Its two ports at the other end are 102 and 110, which are connected, respectively, to WIC 52a and to WIC 72a. Seven splices are indicated in FIG. 5 by Xs.

FIG. 6 shows the couplers and splices of FIG. 5 held on a coupler mount 120 by Sealastic adhesive. The WDC and the two WICs are indicated by the same numerals as in FIG. 5; and the seven splices are indicated by the numeral 122.

The optical structure just described depicts the arrangement that allows two test fibers to be addressed by simply energizing the appropriate laser. If any laser is fired, half of its power is transmitted to a fiber under test. Half of the power returned from the fiber under test is directed to the Wavelength Division Multiplexer, and its wavelength is passed with 99% efficiency to the detector of the instrument.

The benefit of this arrangement is that it introduces almost no excess optical loss compared with a conventional OTDR, and two fibers can be examined without the need for an expensive optical switch. The extra directional coupler, laser, and WDM, that are required, are relatively inexpensive by comparison. A user can thus monitor the same number of fibers with half of the remote OTDRs that would otherwise be required.

Figure 7:
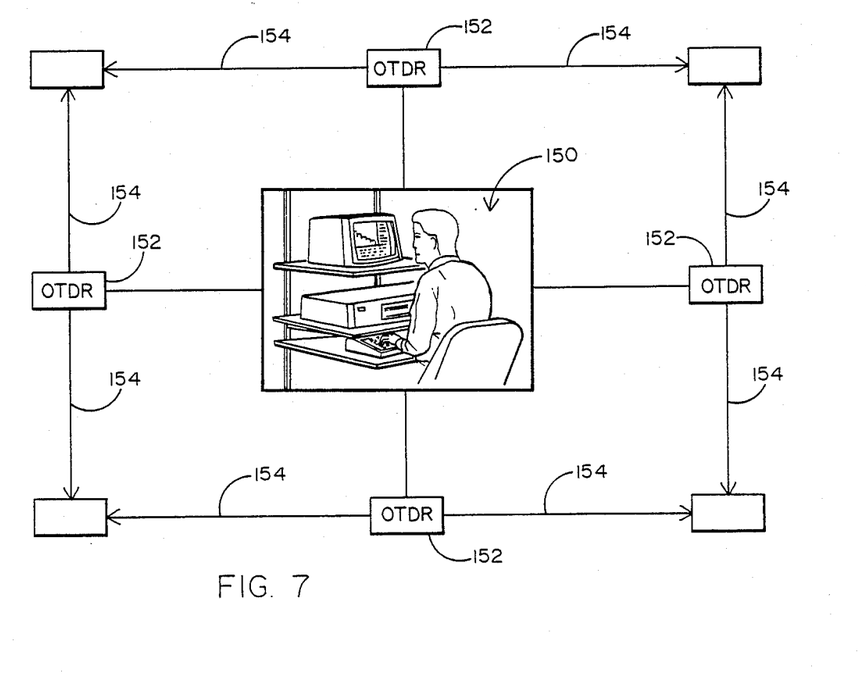
FIG. 7 shows a network of eight repeater huts, serviced by four OTDRs.

FIG. 7 shows a network having a central control station 150, eight repeater huts, and four remotely controlled OTDR units located in four repeater huts 152. Each OTDR monitors two fiber optic cables 154.

Figure 8:
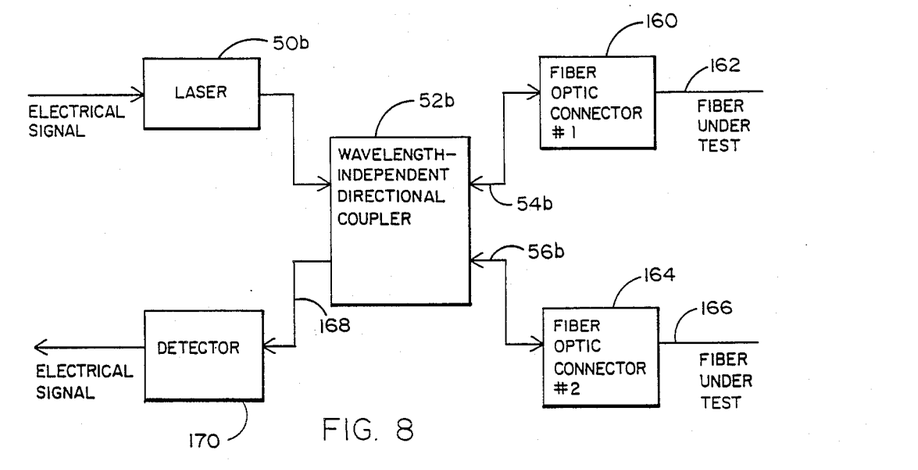
FIG. 8 is a diagram of a subsystem of FIG. 4, in which a single laser is connected to two test fiber strands, whose signals are distinguished by using strands (cables) of different lengths.
Figure 9:
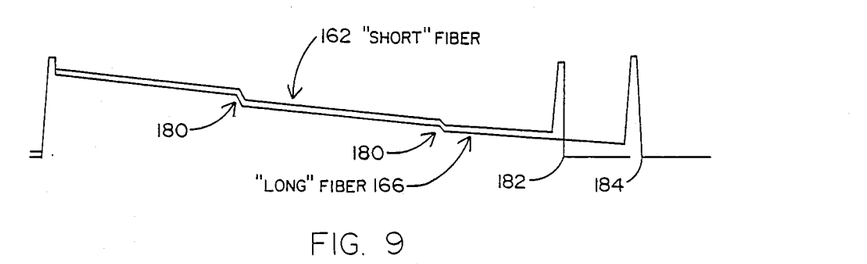
FIG. 9 illustrates the shape of signals from the two fibers having different lengths in FIG. 8.
Figure 10:
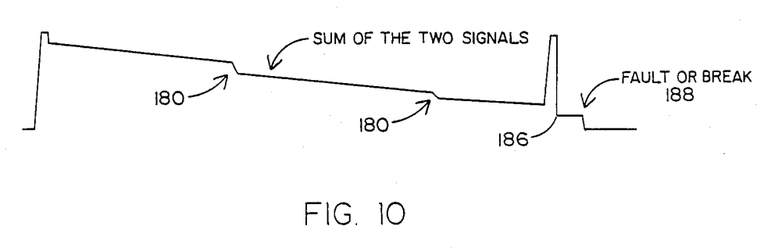
FIG. 10 illustrates the shape of a signal summing the two signals of FIG. 9.

A more ambitious arrangement is illustrated in FIGS. 8–10. In the description of FIG. 4, it was pointed out that the 50% output signals at port 56 of WIC 52 and at port 80 of WIC 72 are wasted.

It is suggested that these ports can also be utilized, permitting one OTDR to monitor four separate fiber optic cables. FIG. 8 shows one-half of such a four cable OTDR system, in which each laser monitors two test fibers. Two of the four test fibers are indicated at 162 and 166. In order for the operator to distinguish between the two returning test signals from fibers 162 and 166, and between the two test signals from the other laser (not shown), the technique used is a differentiation in the total fiber length of the two signals from the same WIC. With appropriate software, this length differential can be used to identify which test fiber has a fault, or break, and where the problem is located.

In FIG. 8, the diagram shows a laser source 50b, similar to laser 50 in FIG. 4, which sends radiation through a WIC coupler 52b. Fifty percent of the laser energy exits port 54b of coupler 52b and travels into a fiber optic connector 160 and test fiber 162. At the same time, the other fifty percent of the laser energy exits port 56b of coupler 2b. and travels into a fiber optic connector 164 and test fiber 166.

Returning reflected signals from both test fibers 162 and 166, which are in different fiber optic cables, are directed back through WIC coupler 52b, and thence along path 68 to a detector 170.

FIGS. 9 and 10 are display graphs showing how the subsystem of FIG. 8 permits fault location in two cables. As stated above, the two test fibers 162 and 166 have different lengths (as do the cables in which they are respectively embedded). FIG. 9 is a simplified display graph of the reflected signals from test fibers 162 and 166. Assume that test fiber 162 is the shorter fiber, and that test fiber 166 is the longer fiber. The signal from each fiber starts at a relatively high level at the left of the figure. In general, each test fiber signal has a gradual, straight line decline towards the right of the figure, except where splice losses, or the like, are indicated at points 180. The end of fiber 162 is indicated by the total loss of signal at point 182. The end of fiber 166 is indicated by the total loss of signal at point 184. The sudden rises in signal at the end of each test fiber are a common result of the Fresnel effect.

The normal signals of the two test fibers, as shown in FIG. 9, are summed and stored in computer memory. FIG. 10 is a display graph of the sum of the signals of the two test fibers 162 and 166; and it also illustrates the result of a fault in the longer test fiber 166.

The summed signal in FIG. 10 shows the same normal drop locations 180 as in FIG. 9. At the end of the shorter test fiber 162, FIG. 10 shows about a fifty percent drop in signal at point 186, following a Fresnel effect rise. Normally, if no fault has developed, the signal would continue its gradual decline from point 186 to the end of the longer test fiber 166.

However, FIG. 10 also illustrates one possible break location at point 188. Since the signal disappears at a point to the right of point 186, it is known that the fault is in the longer test fiber 166; and its distance from the OTDR is indicated by the total length of the signal graph.

If the fault occurs to the left of point 186, the test fiber which is damaged is indicated by the total length of the signal graph. The fault will cause a drop at a new point in the display graph of the summed signals. The distance of the fault from the OTDR is indicated by the length of the signal graph between the OTDR and the new point of signal reduction. If there is some signal extending to, and ending at, the end of the shorter test fiber 162, it is assumed that the fault has occurred in the longer test fiber 166. On the other hand, if there is some signal extending to the end of the longer test fiber 166, it is assumed that the fault has occurred in the shorter test fiber 162.

The technique just described does not permit fine measurements of fiber conditions. But it will respond to, and locate, a break in either test fiber. By adding two more test fibers, both tested by the second laser in FIG. 4, it is possible to locate faults or breaks in four separate fiber optics cables, using a single OTDR.

The two test fibers shown in FIG. 8 are simultaneously checked by firing a single laser. If four test fibers are to be checked by the same OTDR, each laser in FIG. 4 will check two fibers. As previously stated, the two lasers in FIG. 4 are fired at different, non-overlapping, times, in order to avoid mixing of the detector signals. In a four test fiber system, the wavelength dependent coupler 64 of FIG. 4 receives the time-separated returning signals from each of the two wavelength independent couplers 52 and 72, and sends these signals through to the same detector.

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. In a station which is a unit in a communication network providing fiber optics linkages over long distances, said station having at least two separate entering cables, each of which contains a multiplicity of fiber optic strands, a multi-cable OTDR monitoring apparatus comprising:
   a first laser which outputs a higher wavelength laser beam;
   a second laser which outputs a lower wavelength laser beam;
   a first fiber optic test strand included in one of the cables and adapted to be connected to the output of the first laser;
   a second fiber optic test strand included in another cable and adapted to be connected to the output of the second laser;
   a first directional coupler which transmits the output of the first laser to the first test strand;
   a second directional coupler which transmits the output of the second laser to the second test strand;
   a detector for receiving returning laser energy; and
   a third directional coupler which causes the returning laser energy from either the first test strand or the second strand to be transmitted to the detector.

2. The multi-cable OTDR apparatus of claim 1 in which the third directional coupler comprises:
   a first port for receiving the higher wavelength returning energy from the first test strand;
   means for causing substantially all of such higher wavelength energy from the first port to reach the detector;
   a second port for receiving the lower wavelength energy from the second test strand; and
   means for causing substantially all of such lower wavelength energy from the second port to reach the detector.

3. The multi-cable OTDR apparatus of claim 1 in which:
   the first and second directional couplers are each wavelength independent couplers; and
   the third directional coupler is a wavelength dependent coupler.

4. The multi-cable OTDR apparatus of claim 3 in which:
   the first directional coupler has two ports at its laser-connected end, one of which receives the incoming laser radiation, and the other of which directs the returning laser energy from the first test strand to the third directional coupler; and
   the second directional coupler has two ports at its laser-connected end, one of which receives the incoming laser radiation, and the other of which directs the returning laser energy from the second test strand to the third directional coupler.

5. The multi-cable OTDR apparatus of claim 2 in which:
   the first directional coupler has two ports at its laser-connected end, one of which receives the incoming laser radiation, and the other of which directs the returning laser energy from the first test strand to the third directional coupler; and
   the second directional coupler has two ports at its laser-connected end, one of which receives the incoming laser radiation, and the other of which directs the returning laser energy from the second test strand to the third directional coupler.

6. The multi-cable OTDR apparatus of claim 1 in which the first and second directional couplers each have two output ports adapted to be connected to two separate test strands; and which also comprises:
   means for distinguishing from one another the reflected returning signals which reach separate ports of the same directional coupler.

7. The multi-cable OTDR apparatus of claim 6 in which there is a difference in the total length of the two test strands connected to the same directional coupler.

8. In a station which is a unit in a communication network providing fiber optics linkages over long distances, said station having at least two separate entering cables, each of which contains a multiplicity of fiber optic strands, a multi-cable OTDR monitoring apparatus comprising:
   a first fiber optic test strand included in a first cable;
   a second fiber optic test strand included in a second cable;
   the first fiber optic test strand being longer than the second;
   a laser energy source;
   means for detecting laser energy reflected by the fiber optic test strands;
   a directional coupler having two pairs of ports, in which a signal entering either one of each pair exits both of the other pair as a split energy signal;
   the first port of the first pair being connected to the first fiber optic test strand;
   the second port of the first pair being connected to the second fiber optic test strand;
   the first port of the second pair being connected to the laser energy source;
   the second port of the second pair being connected to the reflected energy detecting means; and
   fault location means using the detector-received reflected energy for determining whether an indicated fault is located in the first or second fiber optic test strand.

9. The multi-cable OTDR apparatus of claim 8 which also comprises: a third fiber optic test strand included in a third cable;
   a fourth fiber optic test strand included in a fourth cable;
   the third fiber optic test strand being longer than the fourth;

a second laser energy source having a different wavelength from the first laser energy source;

a second directional coupler having two pairs of ports, in which a signal entering either one of each pair of ports exits both of the other pair of ports as a split energy signal;

the first port of the first pair being connected to the third fiber optic test strand;

the second port of the first pair being connected to the fourth fiber optic test strand;

the first port of the second pair being connected to the second energy laser source;

the second port of the second pair being connected to the reflected energy detecting means;

fault locating means using the detector-received reflected energy for determining whether an indicated fault is located in the third or fourth fiber optic test strand; and a wavelength dependent coupler interposed between the detector and the two directional couplers;

the wavelength dependent coupler having a pair of ports, the first of which receives the reflected signal from the first directional coupler, and the second of which receives the reflected signal from the second directional coupler; and means for sending from the wavelength dependent coupler to the detector substantially the entire reflected energy received at either the first or second port of the wavelength dependent coupler.

10. The method of using a single optical time domain reflectometer to monitor faults in a plurality of fiber optic cables, which comprises:

including first and second fiber optic test strands in separate cables;

firing a laser having a higher wavelength into the first fiber optic test strand;

returning reflections from the first test strand to a first port of a wavelength dependent coupler;

firing a laser having a lower wavelength into the second fiber optic test strand;

returning reflections from the second test strand to a second port of the wavelength dependent coupler; and sending substantially all of the returning reflections which reach either the first or second port of the wavelength dependent coupler to a detector.

11. The method of using a single optical time domain reflectometer to monitor faults in a plurality of fiber optic cables, which comprises:

including first and second fiber optic test strands in separate cables;

the first test strand being longer than the second test strand;

sending a laser signal through a directional coupler simultaneously into the first and second test strands;

directing the returning reflections through the directional coupler to a detector;

summing the returning reflections from the two test strands to provide a display graph of the summed reflections; and if a fault occurs in either the first or second test strand, determining from their summed display whether the fault is in the first or second test strand.

* * * * *